United States Patent [19]

Neuroth

[11] 4,032,178
[45] June 28, 1977

[54] ELECTRIC CONDUIT CONNECTOR

[76] Inventor: Robert J. Neuroth, 101 Kerwin Drive, Ingleside, Ill. 60041

[22] Filed: Sept. 4, 1975

[21] Appl. No.: 610,200

[52] U.S. Cl. .............................. 285/162; 174/65 R; 285/192; 285/319; 285/DIG. 22
[51] Int. Cl.² ...................... F16L 3/04; H02G 3/08
[58] Field of Search .......... 285/158, 159, 319, 162, 285/92, 128, 222, 192, 194, 146, DIG. 22, 195, 419, 373; 174/65 R

[56] References Cited

UNITED STATES PATENTS

| 1,288,902 | 12/1918 | Hyatt et al. | 285/194 |
| 2,445,633 | 7/1948 | Peters | 174/65 R |
| 2,465,844 | 3/1949 | Brushaber | 285/194 X |
| 2,555,292 | 5/1951 | Poupitch | 285/194 |
| 2,799,518 | 7/1957 | Anderson et al. | 285/194 X |
| 2,806,724 | 9/1957 | Anspach et al | 285/419 X |
| 3,369,071 | 2/1968 | Tuisku | 174/65 R |
| 3,814,467 | 6/1974 | Van Buren | 285/92 |

Primary Examiner—Dave W. Arola
Attorney, Agent, or Firm—Joseph P. House, Jr.

[57] ABSTRACT

A seamless one-piece metal sleeve coupling is adapted at one end to couple with an end of an electric conduit and is flared at the other end to a size larger than the entry opening in an electric junction box. The flared portion of the sleeve has a reduced end portion which is small enough to enter the box opening. An annular shoulder for engaging the exterior box margin about the opening is formed at the junction of the flared portion and reduced end portion. A plurality of outwardly bent gripper arms are formed in the reduced end portion for engaging the interior box margin about the opening. The reduced end portion is split in at least one location and has an expansion joint bridging the split.

13 Claims, 5 Drawing Figures

U.S. Patent June 28, 1977 4,032,178
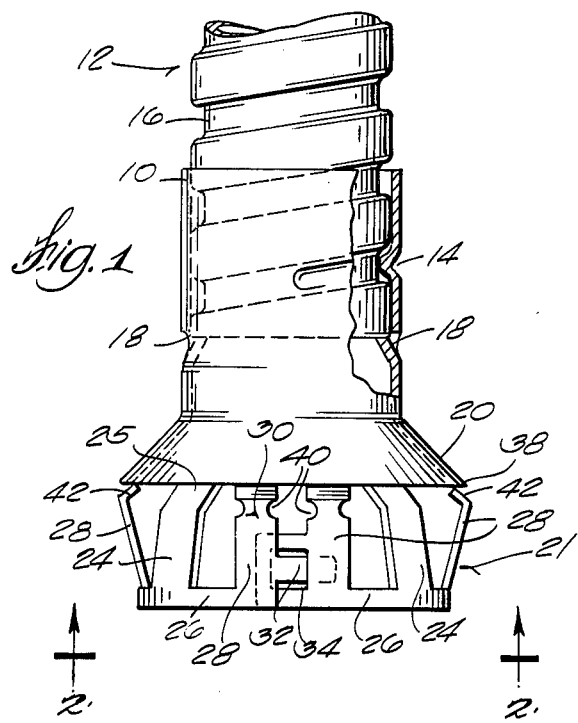
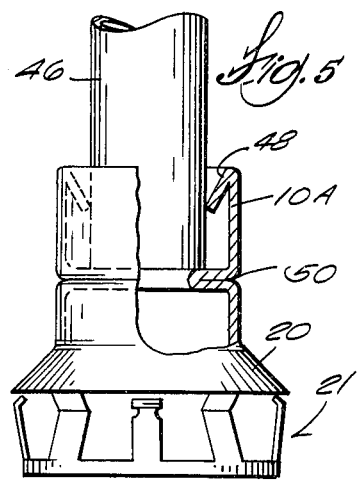
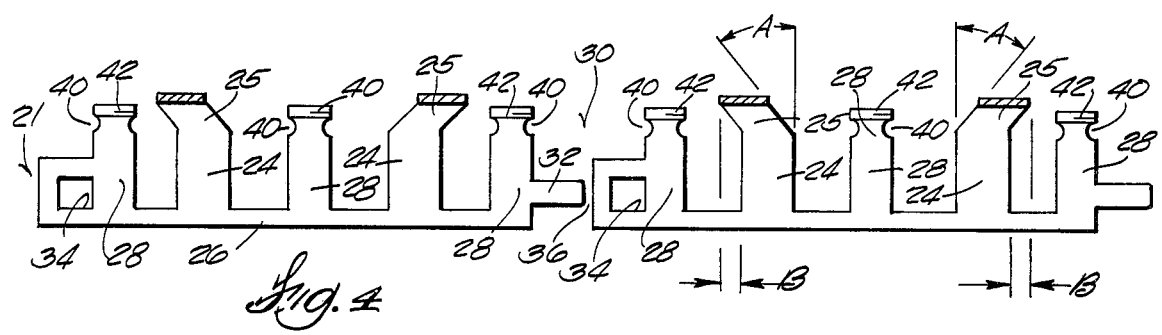
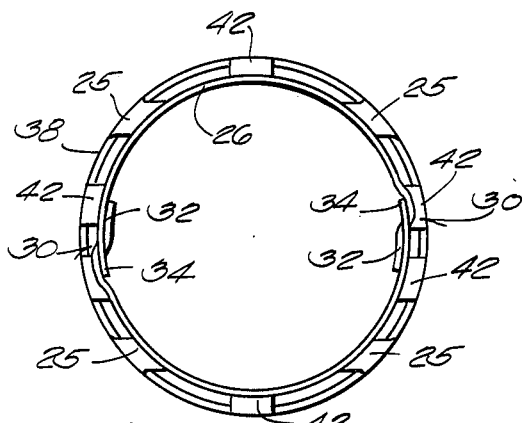
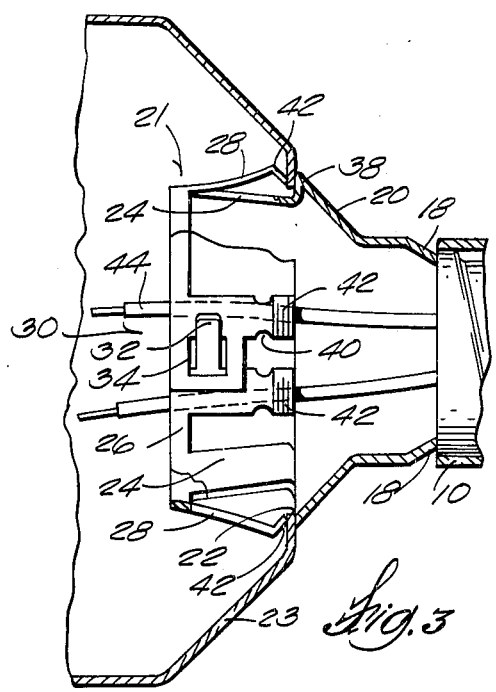

ELECTRIC CONDUIT CONNECTOR

BACKGROUND OF THE INVENTION

U.S. Pat. No. 3,814,467 illustrates a conduit connector, but it is difficult and costly to fabricate. It is made from two pieces which must be fitted together. An object of my invention is to fabricate a connector from a single length of seamless tubing, thus to simplify and reduce the costs of fabrication. For this purpose I fabricate lengths of seamless tubing and flare one end of the tubing to a size larger than the opening in the box and reduce the flared portion to a size small enough to fit into the opening. In this operation difficulty has been encountered in reducing the size of the flared end while maintaining the desired cylindrical shape of the reduced end. The reduced end tends to buckle out of shape and may result in a defective connector.

SUMMARY OF THE INVENTION

In accordance with this invention, I not only have been successfull in forming the connector out of a single length of seamless tubing, but the above-noted difficulty has also been overcome by splitting the reduced end portion in at least one location and bridging the split with an expansion joint including a tongue protruding from one side of the split and an opening in the other side of the split for receiving the tongue. The split enables the flared end to be reduced without buckling and the expansion joint holds the opposite sides of the split in alignment to prevent cutting the insulated wires passing therethrough. In accordance with a further aspect of this invention, gripper arms are cut in the reduced end portion for engaging the interior margin of the opening, the gripper arms being bent at their ends to resiliently engage the interior margin of the opening so that the connector will make good electrical contact with the box despite variations in the wall thickness of the box.

Other objects, features and advantages of the invention will appear from the disclosure hereof.

DESCRIPTION OF THE DRAWINGS

FIG. 1 is a side elevational view of an electric conduit connector embodying this invention and adapted to be connected to BX or "Greenfield" conduit.

FIG. 2 is an end view taken on the line 2—2 of FIG. 1.

FIG. 3 is a longitudinal sectional view of the connector of FIG. 1 attached to an electrical junction box.

FIG. 4 is a fragmentary developed view partly in cross section, of the end of the connector of FIGS. 1-3 which fits inside the junction box.

FIG. 5 is a side elevational view of another electric conduit connector embodiment of this invention and adapted to be connected to thin wall conduit.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

My coupling comprises a unitary one-piece seamless cylindrical spring steel sleeve or tube 10 which is adapted at one end to receive an electrical conduit 12, which in this example is a flexible helically wound conduit commonly known as B.X. or "Greenfield". Sleeve 10 is provided with skewed indentations forming inside ribs 14 to threadably engage the helical grooves 16 in conduit 12 so that conduit 12 and sleeve 10 can be screwed together. Abutments 18 are stamped in opposide sides of sleeve 10 to limit the advance of the conduit connector 10 over the conduit 12.

The other end of sleeve 10 is flared outwardly at 20 to a size which is larger than the circular opening 22 in a junction box 23 into which the connector is to be fitted (see FIG. 3). The end of flared portion 20 is reduced in size at 21 to fit into opening 22 and is cut out to form circumferentially spaced support arms 24, an inner collar 26, flexible gripper arms 28, and expansion joints 30 which each include a tongue 32 and an opening 34 in which the tongue 32 slidably fits. The reduced end portion 21 is slit at 36 (FIG. 4) between tongues 32 and the metal about openings 34 to permit reduction in the diameter of the reduced end portion 21 and eliminate buckling of collar 26 in response to reduction in size. Expansion joints 30 hold the opposite sides of splits 36 in alignment to prevent cutting the insulated wires 44 passing therethrough.

The junction between the flared portion 20 and reduced portion 21 of sleeve 10 forms an annular shoulder 38 for engaging the exterior margin of box opening 22. The ends of flexible gripper arms 28 are desirably notched at 40 and are bent inwardly between notches 40 to form flexible tips 42 for engaging the interior margin of box opening 22 as shown in FIG. 3. Flexible tips 42 permit the connector to make good electrical contact with the box despite variations in the wall thickness of the box. The notches 40 weaken the ends of gripper arms 28 so that flexible tips 42 bend more readily than the body of gripper arms 28.

Gripper arms 28 are made of the same spring steel as sleeve 10 and are normally bent outwardly far enough to engage the interior margin of opening 22 as shown in FIG. 3.

Support arms 24, which support inner collar 26 and gripper arms 28, are preferably provided with oblique root portions 25 which incline at an angle A (FIG. 4) to the longitudinal axis of sleeve 10. These oblique root portions 25 predispose the end 21 of the sleeve to reduce diameter without buckling.

The amount of offset B (FIG. 4) between leg 24 and the juncture of root 25 with flared portion 20 is equal to the difference between the position of four equally spaced points on the circumference of annular shoulder 38 and four equally spaced points on the circumference of inner collar 26. The amount of offset B is exaggerated in FIG. 4 for illustration purposes. The preferred amount of offset desired in any given case is determined by (1) dividing the circumference of annular shoulder 38 by the number of support arms 24, (2) dividing the desired circumference of inner collar 26 by the number of support arms 24, and (3) substracting the second quotient from the first. This provides the preferred offset to compensate for the difference of circumference between annular shoulder 38 and inner collar 26.

The conduit connector of this invention is easy to use. B.X. or "Greenfield" conduit 12 and connector 10 can be threaded together with a twist of the wrist, and connector 10 is then simply plugged into box opening 22 as shown in FIG. 3 and pressed inwardly until gripper arms 28 snap out to engage the inner margin of opening 22. The wires 44 (FIG. 3) extending from the end of conduit 12 into junction box 23 are then connected to other wires (not shown) within box 23 in the conventional manner.

FIG. 5 shows a modification of the above-described connector embodiment which is adapted to be used with thin wall conduit. The modified unitary one-piece seamless cylindrical spring steel sleeve 10 is made larger than the thin wall conduit 45 and has an inwardly bent resilient reentrant collar 48 which is adapted to engage and grip the surface of conduit 46. Sleeve 10 is inwardly and radially indented at 50 to form an abutment which limits the advance of conduit 46 into sleeve 10.

My conduit connector has large openings at both ends, so as not to interfere with drawing electric wires therethrough. This provides a significant advantage over the connector of U.S. Pat. No. 3,814,467 which has a small hole 46 at one end which interferes with drawing wires therethrough.

I claim:

1. An electric conduit connector for connecting one end of an electric conduit to a box having an opening therein for receiving said connector, said connector comprising a unitary one piece metal sleeve adapted at one end to receive an end of said conduit, said sleeve being flared at its other end to a size larger than said opening and having its flared end reduced in diameter to form a reduced end portion which is small enough to enter said opening, said reduced end portion comprising a collar and circumferentially spaced support arms connecting said collar to the flared portion, said collar being split in at least one location and having an expansion joint bridging the split to permit such reduction without buckling of said collar, and means on said reduced end portion for engaging the interior margin of said box about said opening to secure said connector to said box.

2. The connector of claim 1 wherein said expansion joint comprises a tongue formed on said reduced end portion on one side of said split and means on said reduced end portion forming an opening on the other side of said split for slidably receiving said tongue.

3. The connector of claim 1 wherein said means for engaging the interior margin of said box about said opening comprises a plurality of flexible gripper arms on said reduced end portion, said flexible gripper arms being positioned to engage the interior margin of said box about said opening, and the ends of said flexible gripper arms being bent inwardly to form flexible tips for engaging the interior margin of said box about said opening.

4. The connector of claim 3 wherein the side edges of said gripper arms are notched where they are bent to form said flexible tips to make said tips more flexible than the body of said gripper arms.

5. The connector of claim 1 wherein the boundary of said flared portion and said reduced end portion comprises an annular shoulder for engaging the exterior margin of said opening.

6. The connector of claim 1 wherein said collar is split at two diametrically opposed locations, there being an expansion joint bridging each of the splits.

7. The connector of claim 1 in which the sleeve comprises a length of seamless tubing.

8. The connector of claim 1 in which said sleeve is provided with skewed indentations for threaded engagement with a helically wound circuit.

9. The connector of claim 1 in which said sleeve is provided with inwardly projecting abutments to limit the advance of a conduit therein.

10. An electric conduit connector for connecting one end of an electric conduit to a box having an opening therein for receiving said connector, said connector comprising a unitary one piece metal sleeve adapted at one end to receive an end of said conduit, said sleeve being flared at its other end to a size larger than said opening and having a reduced end portion which is small enough to enter said opening, said reduced end portion being split in at least one location and having an expansion joint bridging the split, and means on said reduced end portion for engaging the interior margin of said box about said opening to secure said connector to said box, portions of said reduced end portion being cut away to form an inner collar, support arms connecting said inner collar to the flared portion of said connector, said means comprising flexible gripper arms connected to said inner collar and positioned to engage the interior margin of said box about said opening.

11. The connector of claim 10 wherein each of said support arms is offset by an amount proportional to the difference between the maximum circumference of said flared portion and the circumference of said reduced end portion.

12. The connector of claim 10 wherein each of said support arms is offset by an amount equal to the maximum circumference of said flared portion divided by the number of support arms minus the circumference of said reduced end portion divided by the number of support arms.

13. The connector of claim 10 wherein said reduced end portion is split at two diametrically opposed locations, thereby dividing said reduced end portion into two halves, and wherein there are two support arms in each half of said reduced end portion, the two support arms in each of said halves being offset toward each other.

* * * * *